United States Patent [19]

Moczygemba

[11] 4,091,051

[45] May 23, 1978

[54] BLOCK COPOLYMERS OF ALKADIENES AND MONOVINYL ARENES

[75] Inventor: George A. Moczygemba, Bartlesville, Okla.

[73] Assignee: Phillips Petroleum Company, Bartlesville, Okla.

[21] Appl. No.: 633,883

[22] Filed: Nov. 20, 1975

[51] Int. Cl.$^2$ ............................................. C08F 297/04
[52] U.S. Cl. .................................................. 260/880 B
[58] Field of Search ..................................... 260/880 B

[56] References Cited

U.S. PATENT DOCUMENTS

| | | | |
|---|---|---|---|
| 3,830,880 | 8/1974 | De LaMare | 526/21 |
| 27,145 | 6/1971 | Jones | 260/880 B |
| 3,598,886 | 8/1971 | Hoeg | 260/880 B |
| 3,686,366 | 8/1972 | Winkler | 260/880 B |
| 3,700,748 | 10/1972 | Winkler | 260/880 B |

*Primary Examiner*—Paul R. Michl
*Attorney, Agent or Firm*—Quigg & Oberlin

[57] ABSTRACT

A copolymer having the structure low vinyl polybutadiene/medium vinyl polybutadiene/polystyrene is converted into the hydrogenated counterpart by removing at least about 95% of the olefinic unsaturation by hydrogenation, while not removing more than 5% of the aromatic unsaturation. This hydrogenated copolymer exhibits elongation and tensile strength values that make it useful as a thermoplastic elastomer.

4 Claims, No Drawings

BLOCK COMPOLYMERS OF ALKADIENES AND MONOVINYL ARENES

This invention relates to novel polymers. In one of its more specific aspects, this invention relates to novel thermoplastic elastomers.

BACKGROUND OF THE INVENTION

Various synthetic rubbers made from alkadiene monomers and from monovinyl arenes are known in the art. Among these polymers are thermoplastic elastomers that are noncured, hydrogenated copolymers of the monomers just mentioned. These elastomers exhibit thermoplastic elastomeric properties and can thus be readily formed into useful articles, which exhibit desirable tensile strength and elongation without curing. It would be desirable to have novel thermoplastic elastomers available that exhibit not only such properties, but in addition have a broad temperature range in which they lose their rubbery properties and become fluid such that the polymers can be fabricated by various procedures.

THE INVENTION

It is thus one object of this invention to provide new polymers.

Another object of this invention is to provide new copolymers of butadiene and monovinyl arenes.

Still a further object of this invention is to provide novel block copolymers in which the olefinic unsaturation has been essentially removed by hydrogenation, and which exhibit both thermoplastic and elastomeric properties after the hydrogenation.

A still further object of this invention is to provide a process for making these novel thermoplastic elastomers.

Further objects, advantages, details and embodiments of this invention will become apparent to those skilled in the art from the following detailed description of the invention, the examples, and the appended claims.

In accordance with this invention, I have now found that a copolymer having the structure low vinyl polybutadiene/medium vinyl polybutadiene/poly-(monovinyl arene) becomes a thermoplastic elastomer after removing most or, preferably, at least 95% of the olefinic unsaturation by hydrogenation. The aromatic unsaturation remains essentially unchanged, preferably not more than 5% of the aromatic unsaturation is hydrogenated. The hydrogenated copolymer thus obtained has rubbery properties and at the same time can be handled and shaped like a conventional thermoplastic polymer material.

Thus in accordance with one embodiment of this invention, there is provided a novel block copolymer having the formula low vinyl polybutadiene/medium vinyl polybutadiene/poly(monovinyl arene).

The first block of this copolymer is a poly-1,3-butadiene block having low vinyl content. It is important to this invention that this block is highly linear, i.e. contains as little branching as possible. It is, however, well known in the art that during the polymerization of 1,3-butadiene, the formation of a small percentage of pendant vinyl groups, which after hydrogenation are pendant ethyl groups, is unavoidable. The term "low vinyl content", therefore, refers to a vinyl content which is preferably below about 12 mol % of a total polymerized 1,3-butadiene in the first block of this three block copolymer. In other words, the polymerization is preferably carried out so that a minimum of about 88 mol % of 1,4-polymerization of the butadiene occurs and only up to about 12 mol % of 1,2-polymerization of butadiene occurs. The degree of 1,2-polymerization of the 1,3-butadiene typically is in the range of 6 to 12 mol % in this first block.

The central block of the copolymer of this invention is a medium vinyl poly-1,3-butadiene block. Thus, contrary to the first block in this second block, this formation of vinyl groups is promoted. The quantity of vinyl groups present in this central poly-1,3-butadiene block preferably is in the range of about 25–75 mol % of the total 1,3-butadiene contained in this central medium vinly block.

The third block of the block copolymer of this invention is a poly(monovinyl arene) block. The monovinyl arenes contain from 8–16 carbon atoms per monomer molecule. These monomers can carry other substituents than the vinyl radical on the aromatic nucleus, namely alkyl, cycloalkyl, aryl, alkaryl, and aralkyl radicals. Examples of suitable monovinyl arenes which can be polymerized to form the third block of the copolymer of this invention are styrene, 3-methylstyrene, 4-propylstyrene, 1-vinylnaphthalene, 4-cyclohexylstyrene, p-tolylstyrene, p-benzylstyrene, 1-vinyl-5-butylnaphthalene. The presently preferred monomer for the third block is a styrene. Thus, the preferred block copolymer of this invention has the structure low vinyl poly-1,3-butadiene/medium vinyl poly-1,3-butadiene/polystyrene.

The monomer ratio in wt. % of the entire copolymer for the three blocks can be varied considerably. In the following table the broad ranges and the preferred ranges for the monomers in the three blocks are shown.

TABLE I

| | Low Vinyl Poly-1,3-Butadiene | Medium Vinyl Poly-1,3-Butadiene | Poly(monovinyl arene) | Butadiene/monovinyl arene ratio* |
|---|---|---|---|---|
| Broad Ranges (wt. %) | 5–50 | 10–90 | 1–50 | 95/5 to 50/50 |
| Preferred Ranges (wt. %) | 10–40 | 20–80 | 5–40 | 90/10 to 70/30 |

*The ratio shows the weight percentages of butadiene and monovinyl arene in the polymer.

The molecular weight of the three block copolymer of this invention can vary in broad ranges. Typically, the number average molecular weight will be in the range of about 20,000 to about 400,000, the range of about 50,000 to about 200,000 being preferred. However, variances from the above ranges are within the scope of this invention. Such variances could be necessitated, for instance, by unusual utility requirements.

The polymers of this invention defined by the structure low vinyl poly-1,3-butadiene/medium vinyl poly-1,3-butadiene/poly(monovinyl arene) are useful intermediates to be hydrogenated into polymers that are thermoplastic elastomers.

The preferred embodiment of this invention consists of a three-block copolymer having the structure "hydrogenated low vinyl poly-1,3-butadiene/hydrogenated medium vinyl poly-1,3-butadiene/poly(monovinyl arene)." The various embodiments described above apply to this polymer also, with the further provision, of course, that the two polybutadiene blocks are hydrogenated. The presently most preferred copolymer in accordance with this invention, thus is a copolymer having the structure hydrogenated low vinyl poly-1,3-butadiene/hydrogenated medium vinyl poly-1,3-butadiene/polystyrene. These hydrogenated copolymers exhibit elastomeric properties without curing. Thus, these polymers are valuable as thermoplastic elastomers.

The ranges for the monomer weight percentages in the three blocks, as well as the ranges for the molecular weight of the polymer given above in connection with the non-hydrogenated copolymer apply to the hydrogenated copolymer as well taking, of course, into consideration the slight modification caused by the hydrogenation of the olefinic unsaturation in the molecule.

In accordance with another embodiment of this invention, there is provided a process to produce low vinyl poly-1,3-butadiene/medium vinyl poly-1,3-butadiene/poly(monovinyl arene) block copolymers. This process comprises the steps of first polymerizing a block of 1,3-butadiene in the absence of any vinyl promoting agent to result in a low vinyl poly-1,3-butadiene block, thereafter polymerizing onto this low vinyl poly-1,3-butadiene block, further butadiene monomer in the presence of a vinyl promoting agent such as to produce a 2-block low vinyl poly-1,3-butadiene/ medium vinyl poly-1,3-butadiene copolymer, and finally polymerizing onto this low vinyl poly-1,3-butadiene/medium vinyl poly-1,3-butadiene copolymer a polymer block of at least one monovinyl arene.

More particularly, and in accordance with one embodiment of this invention, this process can be carried out by sequential addition of monomers in three steps. In a first step, butadiene is added to a reactor and the polymerization reaction is carried out by adding a polymerization initiator under the condition that the reactor is essentially free of any vinyl promoting agent. At the end of this polymerization step, after essentially all of the butadiene has polymerized, further butadiene is added and the second butadiene polymerization step is carried out in the presence of a vinyl promoting agent, which is advantageously added to the reactor before the butadiene for the second block is introduced into the reactor. It is, however, also within the scope of this invention to add this butadiene and the vinyl promoting agent for this second polymerization step simultaneously to the reactor. Additional solvent can also be added at this point along with a small additional amount of initiator to scavenge any deleterious impurities. The polymerization is carried out until essentially all the butadiene has polymerized. Thereafter, the monovinyl arene is added to the reactor and polymerized onto the two butadiene polymer blocks formed in the first two polymerization steps.

Alternatively, and in accordance with still a further embodiment of this invention, the two butadiene blocks can be produced from a single butadiene charge. In accordance with this embodiment, the entire quantity of butadiene for both the low vinyl and the medium vinyl poly-1,3-butadiene blocks is added to the reactor. Polymerization initiator is added to the reactor and the polymerization is carried out in the absence of a vinyl promoting agent until a quantity of butadiene has polymerized into a low vinyl poly-1,3-butadiene block of the desired chain length. Thereafter, the vinyl promoting agent is added to the reaction mixture while the polymerization continues. Thereby, the degree of 1,2-polymerization is increased and a medium vinyl poly-1,3-butadiene block is generated. After all the butadiene has polymerized, the monovinyl arene is added to the reaction mixture, and the polymerization is continued until all the monovinyl arene has polymerized.

Examples of various monovinyl arenes useful in accordance with this invention for the production of the unsaturated copolymer has been given above. Styrene is the preferred monovinyl arene monomer.

The important vinyl promoting agent employed in this process for the production of the medium vinyl poly-1,3-butadiene block can be any agent that promotes 1,2- and/or 3,4-polymerization of acyclic conjugated dienes under anionic initiation. Examples for such vinyl promoting agents are dimethyl ether, ethyl methyl ether, di-n-propyl ether, tetrahydrofuran, 1,2-dimethoxyethane, dimethyl sulfide, triethylamine, and N,N,N',N'-tetramethylethylenediamine. These vinyl promoting agents differ in their weight effectiveness. For tetrahydrofuran as the preferred vinyl promoting agent, the recommended ranges of concentration are:

TABLE II

| | Parts by weight of tetrahydrofuran per hundred parts of monomers |
|---|---|
| Broad Range | 0.1 to 25 |
| Preferred Range | 1 to 5 |

The polymerization is in accordance with a further embodiment of this invention carried out in the presence of organomonolithium compounds as polymerization initiators. These organomonolithium compounds have the formula RLi, wherein R is a hydrocarbon radical selected from the group consisting of aliphatic, cycloaliphatic, and aromatic radicals containing from 1 to about 20 carbon atoms per radical. Examples of suitable organomonolithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, 4-cyclohexylbutyllithium. The amount of organomonolithium initiator employed depends upon the desired molecular weight of the polymer but is normally in the range of about 0.1 to 100 millimoles per 100 grams of monomer.

The polymerization process of this invention is usually carried out in the presence of a diluent. Suitable diluents are hydrocarbons which are not detrimental to the polymerization process. Suitable diluents include paraffinic, cycloparaffinic, and aromatic hydrocarbons and mixtures thereof, such as, for example, n-hexane, n-heptane, 2,2,4-trimethylpentane, cyclohexane, benzene, toluene, and the xylenes.

The polymerization time for each monomer charged in the process of this invention can vary broadly. The polymerization time for each monomer charge generally is in the range of a few minutes to 6 hours, preferably from 10 minutes to 2 hours.

The polymerization temperature can also vary substantially. Broadly, this polymerization temperature can be in the range of 15-150° C., preferably in the range of 40° C. to 90° C.

Various materials are known to be detrimental to the initiator system employed in preparing the polymers of this invention. These materials include carbon dioxide, oxygen and water. It is, thus, desirable that the reactant and initiators employed in the process of this invention be freed of these materials, as well as of other materials which may tend to inactivate the initiator. Furthermore, it is desirable to remove air and moisture from the reaction vessel in which the polymerization is to be conducted.

In accordance with a preferred embodiment of this invention, an antioxidant is added to the polymer solution prior to the recovery of the polymer and prior to the inactivation of the polymer mixture, e.g., prior to the treatment of the polymerization mixture to remove the lithium from the polymer. An example for an antioxidant that can be added to the "living" polymer is 2,6-di-t-butyl-4-methylphenol.

Upon completion of the polymerization, the polymerization mixture is then treated to destroy carbon-lithium bonds and to recover the rubbery polymers. A suitable method for accomplishing this result involves steam stripping the diluent from the polymer. In another suitable method, a material that will destroy carbon-lithium bonds such as an alcohol, is added to the mixture to destroy such carbon-lithium bonds and cause coagulation of the polymer. The polymer is then separated from alcohol and diluent by any suitable means, such as decantation or filtration.

The unsaturated copolymers of this invention having the structure low vinyl poly-1,3-butadiene/medium vinyl poly-1,3-butadiene/poly(monovinyl arene) in accordance with a still further embodiment of this invention are converted into hydrogenated copolymers exhibiting properties to make them useful as a thermoplastic elastomer by hydrogenation to remove at least 95 wt. % of the olefinic unsaturation of the polymer and not removing more than 5 wt. % of the aromatic unsaturation.

The hydrogenation step of this embodiment of the process of the invention can be carried out after the polymerization has been terminated and the polymer has been isolated. It is, however, presently preferred to carry out the hydrogenation to be described below immediately following the last polymerization step, i.e., either on the "living" polymer or on the polymer solution before coagulation.

Hydrogenation can be effected in the presence of a variety of catalysts of either heterogeneous or homogeneous type. Examples of suitable heterogeneous catalyst systems are nickel on Kieselguhr, Raney nickel, copper chromate, molybdenum sulfite, and finely divided platinum or other noble metals on a low surface area carrier. Homogeneous catalysts are presently preferred, however, such homogeneous hydrogenation catalysts can be prepared by reducing cobalt, nickel or iron carboxylate or alkoxide with an aluminum alkyl compound. An example of a preferred, homogeneous catalyst is that formed by the reduction of nickel octanoate by triethylaluminum. The polymer, preferably in solution in an inert solvent, is contacted with the catalyst under conditions which include temperatures in the range of about 0 to 250° C. and pressurization with hydrogen up to a total pressure of about 1,000 psig. The reaction time can vary from 1 minute to 25 hours or more. Preferred conditions involved temperatures of 10 to 200° C., hydrogen pressures of 10 to 500 psig and reaction times of about 10 minutes to 10 hours. When treating the polymer in solution, the pressure is sufficiently high to maintain the reaction mixture substantially in the liquid phase.

Upon the effective completion of the hydrogenation reaction, the hydrogenated polymer can be isolated by conventional techniques. For example, the catalyst components can be converted to water soluble salts and washed from the polymer solution. An antioxidant can be added if desired followed by coagulation of the polymer, filtration or decantation to isolate the polymer and, finally, removal of solvent traces under reduced pressure.

The hydrogenated polymers of this invention can be used in the fabrication of hoses, belting, extruded and moded goods for diverse applications, including those in the building construction, automotive, medical and household article fields. Further suitable uses include flexible films, protective coatings and the use of the polymers as ingredients in adhesive compositions.

The invention will still be more fully understood from the following examples, which are intended to illustrate the invention, not to limit the scope of the protection.

The polymerizations of these examples were carried out under nitrogen in capped beverage bottles employing anhydrous reactants and conditions. The bottles were tumbled in a constant temperature bath for the stipulated polymerization times at the stipulated polymerization temperature.

EXAMPLE I

Four parallel runs were made in which triblock polymers, having the configuration, low vinyl poly-1,3-butadiene/medium vinyl poly-1,3-butadiene/polystyrene were synthesized by sequential monomer addition. Variations in relative block lengths and in initiator level were made. The runs were carried out in accordance with the following recipe and conditions:

| Recipe | Run 1 | Run 2 | Run 3 | Run 4 |
|---|---|---|---|---|
| Step 1 | | | | |
| Cyclohexane, phm[a] | 195 | 195 | 195 | 195 |
| 1,3-Butadiene, phm | 25 | 25 | 25 | 25 |
| n-Butyllithium, mhm[b] | 1.8 | 1.3 | 1.8 | 1.3 |
| Polymerization temp., ° C | 70 | 70 | 70 | 70 |
| Polymerization time, min. | 45 | 45 | 45 | 45 |
| Step 2 | | | | |
| Cyclohexane, phm | 450 | 450 | 450 | 450 |
| 1,3-Butadiene, phm | 60 | 60 | 50 | 50 |
| Tetrahydrofuran, phm | 5 | 5 | 5 | 5 |

(-continued)

|  | | | | |
|---|---|---|---|---|
| n-Butyllithium, mhm[c] | 0.66 | 0.66 | 0.66 | 0.66 |
| Polymerization temp., °C | 70 | 70 | 70 | 70 |
| Polymerization time, min. | 30 | 30 | 30 | 30 |
| Step 3 | | | | |
| Styrene, phm | 15 | 15 | 25 | 25 |
| Polymerization temp., °C | 70 | 70 | 70 | 70 |
| Polymerization time, min. | 45 | 45 | 45 | 45 |

[a] Parts by weight per hundred of monomer.
[b] Grams millimoles per hundred grams of monomer.
[c] A small quantity of initiator is added to scavenge impurities not removed by normal purification and adventiously introduced in charging ingredients for Step 2, particularly the solvent and tetrahydrofuran.

The unhydrogenated polymers were not isolated. An amount of isopropyl alcohol equivalent to the lithium present in the polymerization mixture was added as a dilute solution in cyclohexane to inactivate each polymerization product mixture of the 4 runs. Then each unhydrogenated polymer solution was sampled. The samples were coagulated in isopropyl alcohol followed by isolation of the polymer. The physical properties of the polymers are shown in the following Table III.

nickel hydrogenation catalyst was performed by the triethylaluminum reduction of nickel octanoate in a molar ratio of 2 triethylaluminum/1 nickel octanoate. The catalyst was employed at the level of 5 millimoles nickel per hundred grams rubber. The hydrogenation was carried out at approximately 50 psig hydrogen and 70° C. for 2 hours. Following hydrogenation, 2,6-di-t-butyl-4-methylphenol (one part by weight per hundred of rubber) was added, the polymer was coagulated in isopropyl alcohol, collected on a filter and solvent traces were removed in a vacuum oven. The polymers were evaluated and the data determined for these hydrogenated polymers are shown in Table IV.

From these data it can be seen that the novel hydrogenated polymers possess substantial tensile strength and elongation, even at elevated temperatures, and excellent ozone resistance even upon extended exposure. The hydrogenated polymers are of triblock structure hydrogenated low vinyl poly-1,3-butadiene-

TABLE IV

| | Run | | | |
|---|---|---|---|---|
| Properties of Hydrogenated Polymers | 1 | 2 | 3 | 4 |
| Melt flow[a] | 8.8 | 1.5 | 19.9 | 2.4 |
| 300% Modulus[b] | 760 | 760 | 1010 | 1140 |
| Tensile (25° C.), psi[b] | 1100 | 1460 | 1150 | 1590 |
| Tensile (70° C.), psi | 300 | 380 | 310 | 440 |
| Elongation (25° C.), %[b] | 550 | 670 | 430 | 510 |
| Elongation (70° C.), % | 115 | 205 | <100 | 170 |
| Permanent set, %[b] | 21 | 24 | 32 | 35 |
| Shore A Hardness[c] | 77 | 75.5 | 80 | 81 |
| Ozone resistance [d] | specimen length: 5 in./4 in./3 in. | | | |
| 1 day | 0/0/0 | 0/0/0 | 0/0/0 | 0/0/0 |
| 2 days | 0/0/0 | 0/0/0 | 0/0/0 | 0/0/0 |
| 6 days | 0/0/0 | 0/0/0 | 0/0/0 | 0/0/0 |

[a] Melt flow as g./10 min. at 200° C./21.6 kg, ASTM D 1238.
[b] ASTM D 412–66.
[c] ASTM D 2240–68
[d] No cracks appeared in specimens of specified length by 0.5 in. by 0.08 in. clamped in bent loop shape such that the specimen ends were face to face while exposed to 50 parts ozone per hundred million air at 40° C. for the specified time periods.

TABLE III

| | Run | | | |
|---|---|---|---|---|
| Properties of Unhydrogenated Polymers | 1 | 2 | 3 | 4 |
| Inherent viscosity [a] | 0.88 | 1.16 | 0.79 | 1.09 |
| Gel, Wt. % [b] | 0 | 0 | 0 | 0 |
| Trans, Wt. % [c] | 29.6 | 32.5 | 27.1 | 28.9 |
| Vinyl, wt. % [c] | 29.3 | 32.7 | 30.2 | 28.5 |

Inherent viscosity determined in accordance with U.S. 3,278,508, column 20, note *a* with the modification that the solution was not filtered through a sulfur absorption tube but rather a sample of the solution was filtered through a fritted glass filter stick of grade C porosity and pressured directly into the viscometer.
The gel content of the polymer was determined in weight percent in accordance with U.S. 3,278,508, column 20, note *b*.
Determined by infrared absorption spectroscopy.

EXAMPLE II

The unhydrogenated polymers synthesized in accordance with Example I were thereafter hydrogenated. To do this a solution of the inactivated polymer in cyclohexane containing approximately 10 wt. % of polymer, was subjected to hydrogenation in the presence of nickel hydrogenation catalyst. The hydrogenated medium vinyl poly-1,3-butadiene-polystyrene.

Reasonable variations and modifications, which will become apparent to those skilled in the art, can be made in this invention without departing from the spirit and scope thereof.

I claim:

1. A copolymer having the structure hydrogenated low vinyl poly-1,3-butadiene block/hydrogenated medium vinyl poly-1,3-butadiene block/poly(monovinyl arene) block wherein said low vinyl poly-1,3-butadiene block contains 6–12 mol % vinyl based on the total butadiene is the low vinyl poly-1,3-butadiene block, and wherein said medium vinyl poly-1,3-butadiene block contains 25–75 mol % of vinyl based on the total butadiene content of said medium vinyl poly-1,3-butadiene block.

2. A copolymer in accordance with claim 1 wherein said low vinyl poly-1,3-butadiene block is 5–50 wt. % of the total copolymer, the medium vinyl poly-1,3-butadiene block is 10–90 wt. % of the total copolymer and said poly(monovinyl arene) block is 1–50 wt. % of the total copolymer.

3. A copolymer in accordance with claim 1 wherein said monovinyl arene is styrene.

4. A copolymer in accordance with claim 1 having a weight average molecular weight in the range of about 20,000 to about 400,000.

* * * * *

UNITED STATES PATENT OFFICE
CERTIFICATE OF CORRECTION

Patent No. 4,091,051                    Dated   May 23, 1978

Inventor(s) George A. Moczygemba

It is certified that error appears in the above-identified patent and that said Letters Patent are hereby corrected as shown below:

Column 9, line 7, delete "is" and insert -- in --.

Signed and Sealed this

Thirty-first Day of October 1978

[SEAL]

Attest:

RUTH C. MASON
Attesting Officer

DONALD W. BANNER
Commissioner of Patents and Trademarks